US012635826B2

(12) United States Patent (10) Patent No.: US 12,635,826 B2
Dixon et al. (45) Date of Patent: May 26, 2026

(54) ELECTRIC GRILL AND SMOKING DEVICE

(71) Applicant: W.C. BRADLEY CO., Columbus, GA (US)

(72) Inventors: William Dixon, Columbus, GA (US); Alex Gafford, Midland, GA (US); Ramin Khosravi Rahmani, Columbus, GA (US); Sleiman Abdallah, Columbus, GA (US); Thomas Kessler, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 777 days.

(21) Appl. No.: 17/378,364

(22) Filed: Jul. 16, 2021

(65) Prior Publication Data

US 2022/0031107 A1 Feb. 3, 2022

Related U.S. Application Data

(60) Provisional application No. 63/076,352, filed on Sep. 9, 2020, provisional application No. 63/059,574, filed on Jul. 31, 2020.

(51) Int. Cl.
*A47J 27/00* (2006.01)
*A23B 4/056* (2006.01)
(Continued)

(52) U.S. Cl.
CPC ............. *A47J 27/004* (2013.01); *A23B 4/056* (2013.01); *A47J 27/002* (2013.01); (Continued)

(58) Field of Classification Search
CPC .... A47J 27/004; A47J 27/002; A47J 37/0709; A23B 4/056; F24C 7/046; F24C 15/18;

F24C 15/22; F24C 15/32; F24C 15/10; F24C 15/101; F24C 15/102; F24C 15/104; F24C 15/105; F24C 15/107; F24C 15/166; F24C 15/325; F24C 15/34; A23V 2002/00

See application file for complete search history.

(56) References Cited

U.S. PATENT DOCUMENTS 1,835,602 A 12/1931 Kercher et al.
3,757,671 A 9/1973 Warshauer et al.
(Continued)

FOREIGN PATENT DOCUMENTS

AU 2015305920 A1 2/2017
CN 108224496 A * 6/2018 .............. F24C 15/00
(Continued)

OTHER PUBLICATIONS

Abdjukov, RU 2076461 (Year: 1997).*
(Continued)

*Primary Examiner* — Vy T Nguyen
(74) *Attorney, Agent, or Firm* — GableGotwals; David G. Woodral

(57) ABSTRACT

A cooking apparatus includes a first electric heating element, a reflective surface below the first electric heating element, and a cooking surface above the first electric heating element. The cooking surface is heated by radiant energy from the electric heating element and becomes heated to emit heat to food on the cooking surface.

17 Claims, 19 Drawing Sheets

TOWARDS THE
COOKING SURFACE 106
102
100
104

RADIATIVE BEAMS NOT DIRECTED
TO THE COOKING SURFACE

(51) Int. Cl.

| | |
|---|---|
| *A47J 37/07* | (2006.01) |
| *F24C 7/04* | (2021.01) |
| *F24C 15/18* | (2006.01) |
| *F24C 15/22* | (2006.01) |
| *F24C 15/32* | (2006.01) |

(52) U.S. Cl.

CPC .......... *A47J 37/0709* (2013.01); *F24C 7/046* (2013.01); *F24C 15/18* (2013.01); *F24C 15/22* (2013.01); *F24C 15/32* (2013.01); *A23V 2002/00* (2013.01)

(56) References Cited

U.S. PATENT DOCUMENTS

| | | | | |
|---|---|---|---|---|
| 4,386,558 | A * | 6/1983 | Holman | A47J 37/0629 |
| | | | | 219/400 |
| 6,104,004 | A * | 8/2000 | Ragland | A47J 37/0786 |
| | | | | 99/450 |
| 7,301,128 | B2 * | 11/2007 | Li | A47J 36/38 |
| | | | | 219/465.1 |
| 8,053,707 | B2 | 11/2011 | Hoyles et al. | |
| 10,034,578 | B2 * | 7/2018 | Ahmed | A47J 37/0629 |
| 2011/0186561 | A1 * | 8/2011 | Ahmed | A47J 37/0709 |
| | | | | 219/450.1 |
| 2012/0048864 | A1 * | 3/2012 | Lin | A47J 37/0676 |
| | | | | 220/573.1 |
| 2014/0130683 | A1 * | 5/2014 | Ahmed | A23B 4/052 |
| | | | | 99/473 |
| 2017/0164783 | A1 | 6/2017 | Sauerwein et al. | |
| 2018/0028018 | A1 * | 2/2018 | Barnett | A47J 37/0786 |
| 2020/0107565 | A1 * | 4/2020 | Swayne | A23L 13/428 |
| 2020/0329909 | A1 * | 10/2020 | Conrad | F24C 7/08 |

FOREIGN PATENT DOCUMENTS

| | | | |
|---|---|---|---|
| DE | 7917979 | U1 | 10/1979 |
| WO | PCT/US2021/42041 | | 3/2022 |

OTHER PUBLICATIONS

JP 4375667 B2 (Year: 2009).*
KR 101552042 B1 (Year: 2015).*
KR 20100006105 U (Year: 2010).*
EU No. 21849187.6; PCT/US2021/042041; Supplementary European Search Report; Published Jul. 2, 2024; Applicant: W.C. Bradley Co.
International Search Report and Written Opinion of the European Patent Office; Application No. 21849187.6-1005; 1 Published Aug. 19, 2025; Applicant W.C. Bradley Co.

* cited by examiner

TOWARDS THE
COOKING SURFACE

106

100

102

104

RADIATIVE BEAMS NOT DIRECTED
TO THE COOKING SURFACE

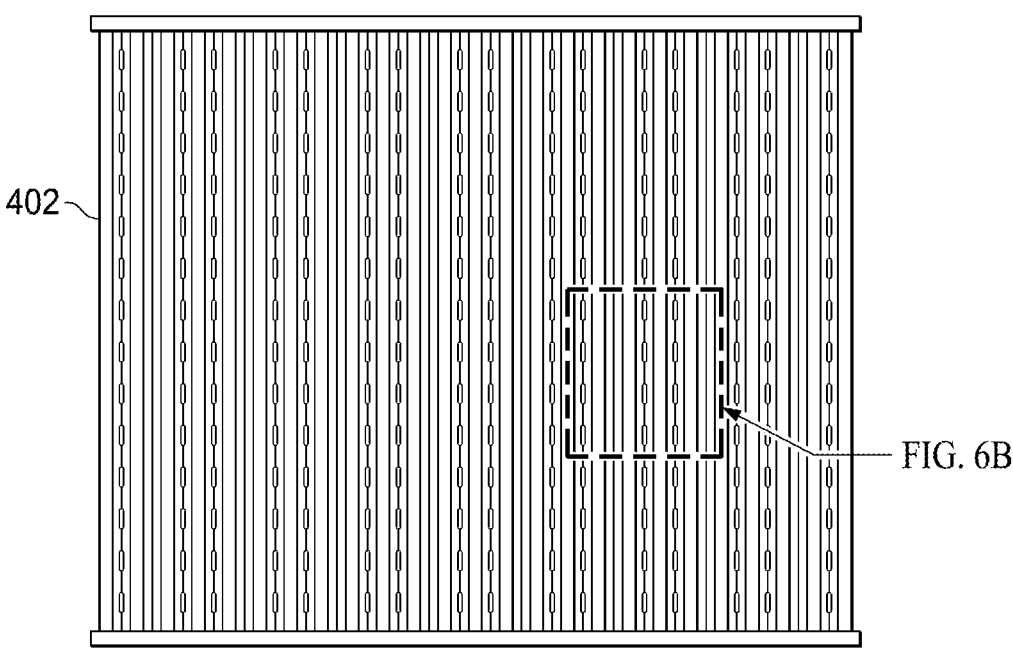
402
FIG. 6B
FIG. 6A
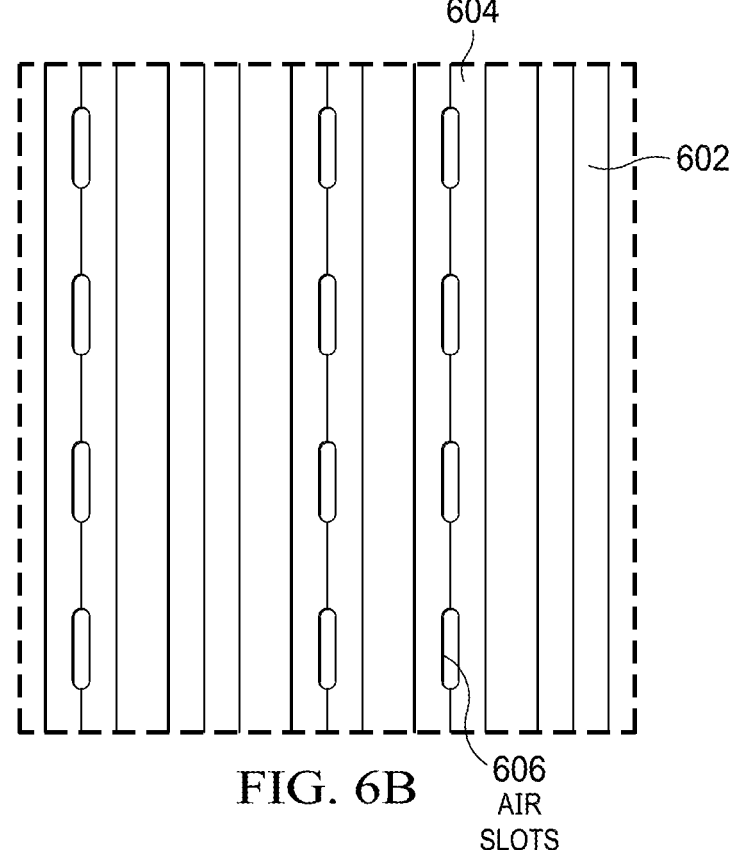
604
602
606
AIR
SLOTS
FIG. 6B

ELECTRIC GRILL AND SMOKING DEVICE

CROSS-REFERENCE TO RELATED CASES

This application claims the benefit of U.S. provisional patent application Ser. No. 63/059,574, filed on Jul. 31, 2020, and U.S. provisional patent application Ser. No. 63/076,352, filed on Sep. 9, 2020, and incorporates such provisional application by reference into this disclosure as if fully set out at this point.

FIELD OF THE INVENTION

This disclosure relates to cooking devices in general and, more specifically, to electrically powered cooking devices.

BACKGROUND OF THE INVENTION

There are currently several electric powered grills marketed by different companies. The common principle is to use the available AC power in a house to energize a Calrod® heating element. As a voltage is applied to the electrical resistor inside the heating element, the electrical current leads to generation of thermal energy inside the Calrod® heating element. The temperature at the Calrod® heating element surface increases and its outer surface starts to radiate heat. The radiative heat generated by the Calrod® provides heat to a cooking surface, which is an open cooking grate that shares the same principle as the ones used in convective gas grills.

Limited available power (compared to gas or charcoal grills) restricts the performance of current electric grills. To be able to achieve and maintain a temperature suitable for grilling (450-650° F.), the available cooking area is limited to rather small surfaces. Furthermore, the free flow of ambient air around the open cooking grate increases the heat loss via convection and results in a longer initial warmup time for the grill, a longer recovery time, and lower temperature and heat available for cooking.

Additionally, with current electric grills, lack of an open flame combined with the relatively low cooking temperatures can lead to a lack of perception of grilled or smoked flavor.

What is needed is a system and method for addressing the above, and related, issues.

SUMMARY OF THE INVENTION

The invention of the present disclosure, in one aspect thereof, comprises a cooking apparatus having a first electric heating element and a reflective surface below the first electric heating element. The apparatus has a cooking surface above the first electric heating element. The cooking surface is heated by radiant energy from the electric heating element and becomes heated to emit heat to food on the cooking surface.

Some embodiments may include an insulative layer below the reflective surface that impedes the escape of heat below the reflective surface. The cooking surface may define a plurality of air slots allowing heated air to rise from below the cooking surface to above the cooking surface. The apparatus may have an air opening defined through the reflective surface and the insulative layer. A restrictor cover may be provided proximate the air opening to limit air flow through the air opening.

The cooking surface may define a plurality of spaced apart peaks interposed by a plurality of valleys, the plurality of air slots being defined in the plurality of valleys. The first electric heating element is arranged to be under one of the plurality of valleys.

The apparatus may include a smoker box adjacent to the cooking surface, the smoker box and the cooking surface sharing a common cooking volume within a cooking chamber. The smoker box may include a second electric heating element below a smoking media tray. In some cases, the first electric heating element and the second electric heating element share total power available from a household outlet.

An emitter plate may interpose the second heating element and the media tray. The emitter plate may be corrugated. A standoff may be provided in the smoking media tray.

The invention of the present disclosure, in another aspect thereof, comprises an apparatus having at least one electric heating element, and a cooking surface above the heating element, the cooking surface absorbing energy from the heating element and reemitting the absorbed energy to heat food. The apparatus includes a reflective surface below the electric heating element having a contour configured to reflect heat radiating downward from the at least one electric heating element back toward the cooking surface. The apparatus also includes a lower housing spaced apart from the reflective surface to define an insulating space between the reflective surface and the lower housing.

In some embodiments, the cooking surface defines a plurality of spaced apart peaks with a plurality of air slots between adjacent ones of the plurality of spaced apart peaks. An air opening may be defined through the reflective surface and through the lower housing, the air opening being restricted to limit air flow therethrough. The apparatus may further comprise at least one additional electric heating element in a smoking box adjacent to the cooking surface, the smoking box and cooking surface being contained in a single cooking chamber.

The invention of the present disclosure, in another aspect thereof, comprises a cooking apparatus having a cooking chamber with a cooking surface and an adjacent smoker box. A first electric heating element below the cooking surface heats the cooking surface. A reflective surface below the first electric heating element reflects radiant heat from the first electric heating element upward toward the cooking surface. A heat insulator is below the reflective surface. A second electric heating element heats the smoker box to produce smoke from smoking media in the smoker box.

In some embodiments, the apparatus further comprises an air intake defined through the reflective surface to admit air below the cooking surface, wherein the cooking defines a plurality of air openings whose area comprises from 5-15% of an area of the cooking surface. In some cases, each of the plurality of air openings defines a slot with a length between 0.8 and 2.2 mm and having a length to width ratio between 6 and 12.

BRIEF DESCRIPTION OF THE DRAWINGS

FIG. 6A is an overhead view of a combination cooking grate and restrictive emitter plate according to aspects of the present disclosure.

FIG. 6B is a close-up overhead view of the combination cooking grate and restrictive emitter plate of FIG. 6A.

DETAILED DESCRIPTION OF THE PREFERRED EMBODIMENTS

According to aspects of the present disclosure, various embodiments of electric grills disclosed herein addresses the need for higher thermal efficiency with a combination of features. In various embodiments features may include, among others, a reflective body under a heating element; a wall cavity under the heating element and around a cooking chamber; a combination emitter plate/cooking grate; positioning of the heating element; and design and configuration of the heating element.

Various embodiments of the present disclosure rely on resistive heating elements for production of the high temperatures necessary for safe food preparation. Also known as Joule heating, resistive heating occurs as electricity flows through a conductive element, which may be in the shape of a wire or rod that can be bent or shaped to vary the heated area and intensity of heating. The amount of current flowing through the heating element also alters the degree of heat produced.

Figure 1:
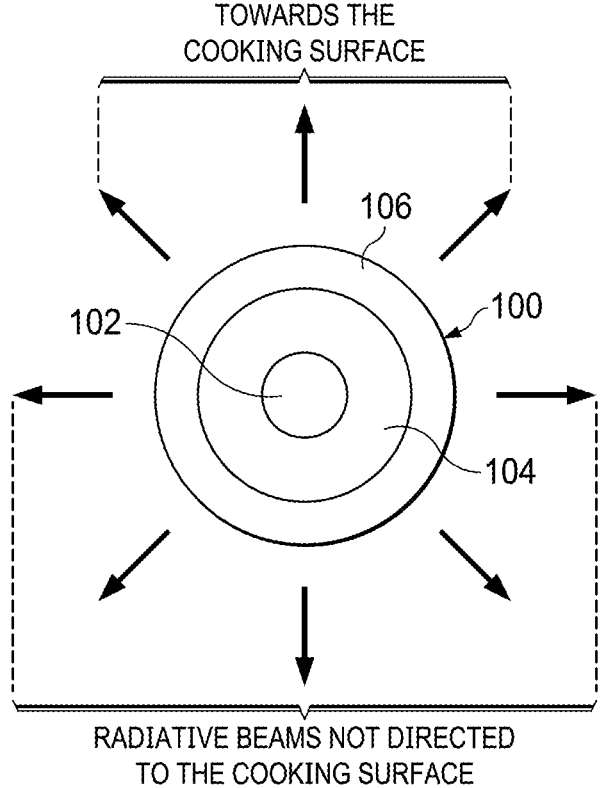
FIG. 1 is a stylized end view of a resistive heating element radiating heat under power.

Tubular resistive heating elements find application in embodiments of the present disclosure, as can be seen in FIG. 1, a stylized end view of a resistive heating element 100 radiating heat under power. The heating element 100 may comprise a resistive heating element core 102, surrounded by an electrical insulator 104, which is surrounded by a metallic or other casing 106. The tubular heating element 100 can be bent or formed into particular shapes or pathways for desired heating characteristics. According to various embodiments of the present disclosure, Calrod® heating elements are used, as they are widely available and provide the necessary heating performance.

As shown in FIG. 1, a Calrod® heating element 100 is an almost uniform and omnidirectional radiative heat flux generator. The end cutaway view of FIG. 1 shows a schematic view of radiative heat uniformly emitted from a Calrod® element in a 360° fashion around its axis. A large portion of generated heat is directed away from a cooking surface (e.g., downward as shown in FIG. 1). This otherwise wasted heat can be remitted back towards the cooking surface in various embodiments of the present disclosure. This may be achieved, for example, by providing a solid surface with reflective properties and geometry that may combined additional thermal barriers underneath, as described further below.

Figure 2A:
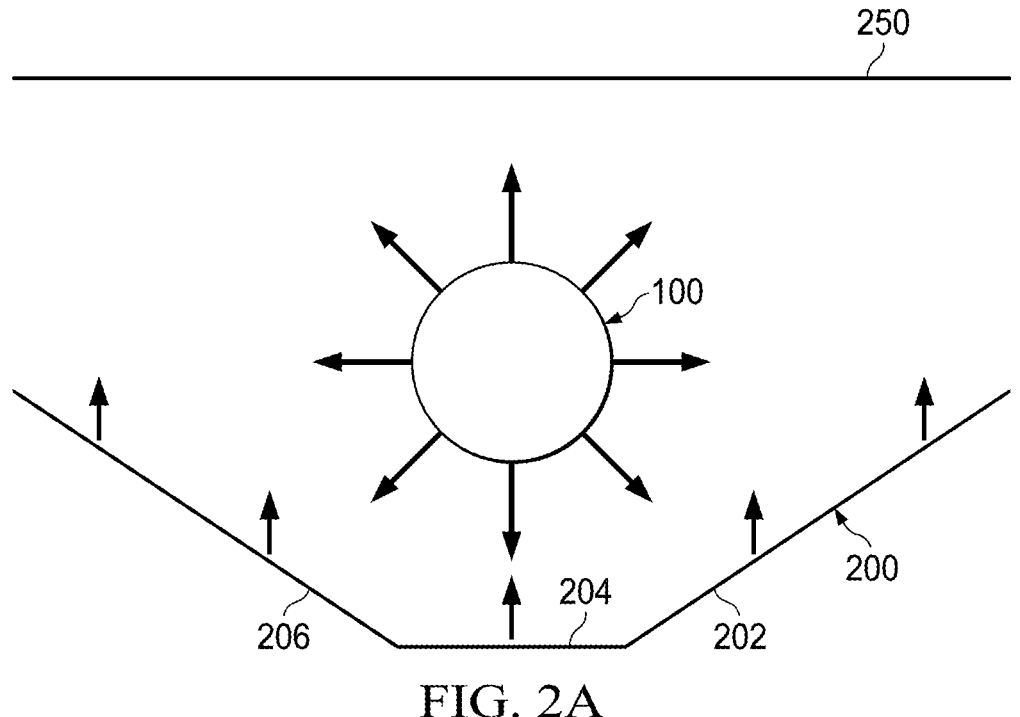
FIG. 2A is an end cutaway view of a reflective heat shield surface in conjunction with a resistive heating element according to aspects of the present disclosure.
Figure 2B:
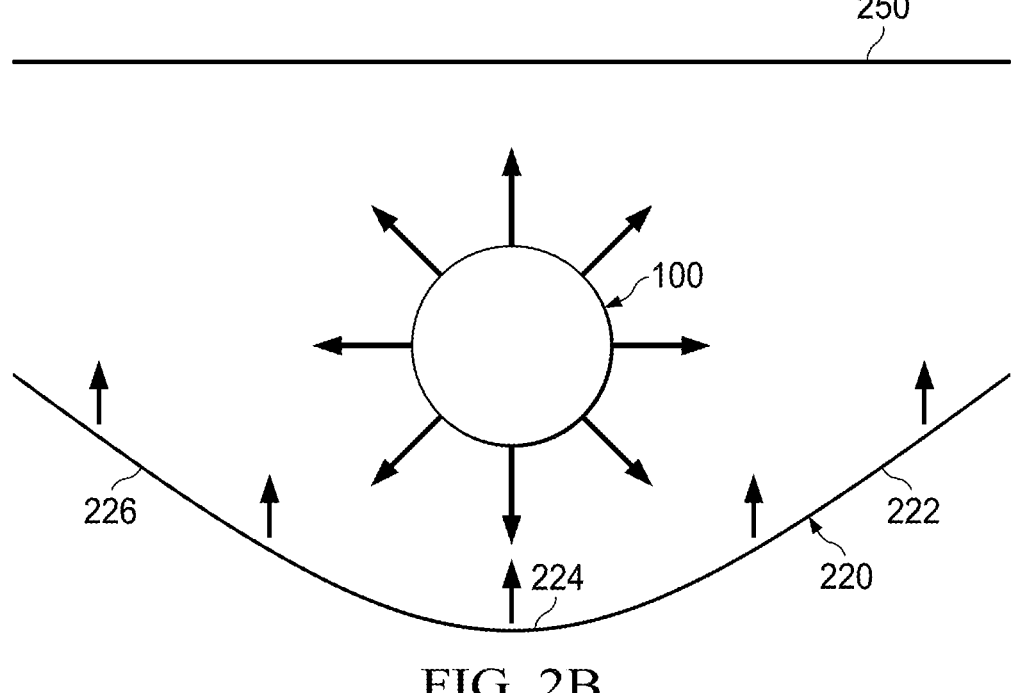
FIG. 2B is another end cutaway view of a reflective surface in conjunction with a resistive heating element according to aspects of the present disclosure.

Referring now to FIG. 2A an end cutaway view of a reflective heat shield surface 200 in conjunction with a resistive heating element 100 according to aspects of the present disclosure is shown. The reflective surface 200 has a polygonal cross-section to reemit the heat towards a cooking surface 250. Here the reflective surface 200 comprises a lower planar region 204 directly below the heating element 100, and upwardly sloped side planes 202, 206. However, the geometry can be any other polygon or curvature (such as parabola) that redirects the heat upward (as seen in FIG. 2B). The reflective surface 200 (and others according to the present disclosure) may comprise a metal or alloy with a surface that reflects, absorbs and re-emits (e.g., in the infrared) energy received from the heating element 100. The reflective surface 200 may comprise aluminum or another suitable metal or reflective and heat resistant material.

FIG. 2B is another end cutaway view of a reflective surface 220 in conjunction with the resistive heating element 100 below a cooking surface 250, according to aspects of the present disclosure. The reflective surface 220 here has a continuous shape of joined curves (e.g., similar to a parabola). A lower surface 224 sits below the heating element 100 and reflects heat upwards. Side surfaces 220, 226 curve upward toward the heating element 100 and also reflect heat toward the cooking surface 250.

As the reflective surface (e.g., 200, 220) under the Calrod® heating element 100 is subject to heat flux itself, as its temperature increases it begins to reemit absorbed heat. While the reflective surface 200, 220 is remitting a portion of the heat upward, in the absence of any barrier, it can start to transfer a portion of the heat downward (i.e., away from the cooking surface 250). Adding a thermal insulator prevents this and preserve the thermal energy for cooking purposes.

Figures 3A, 3B:
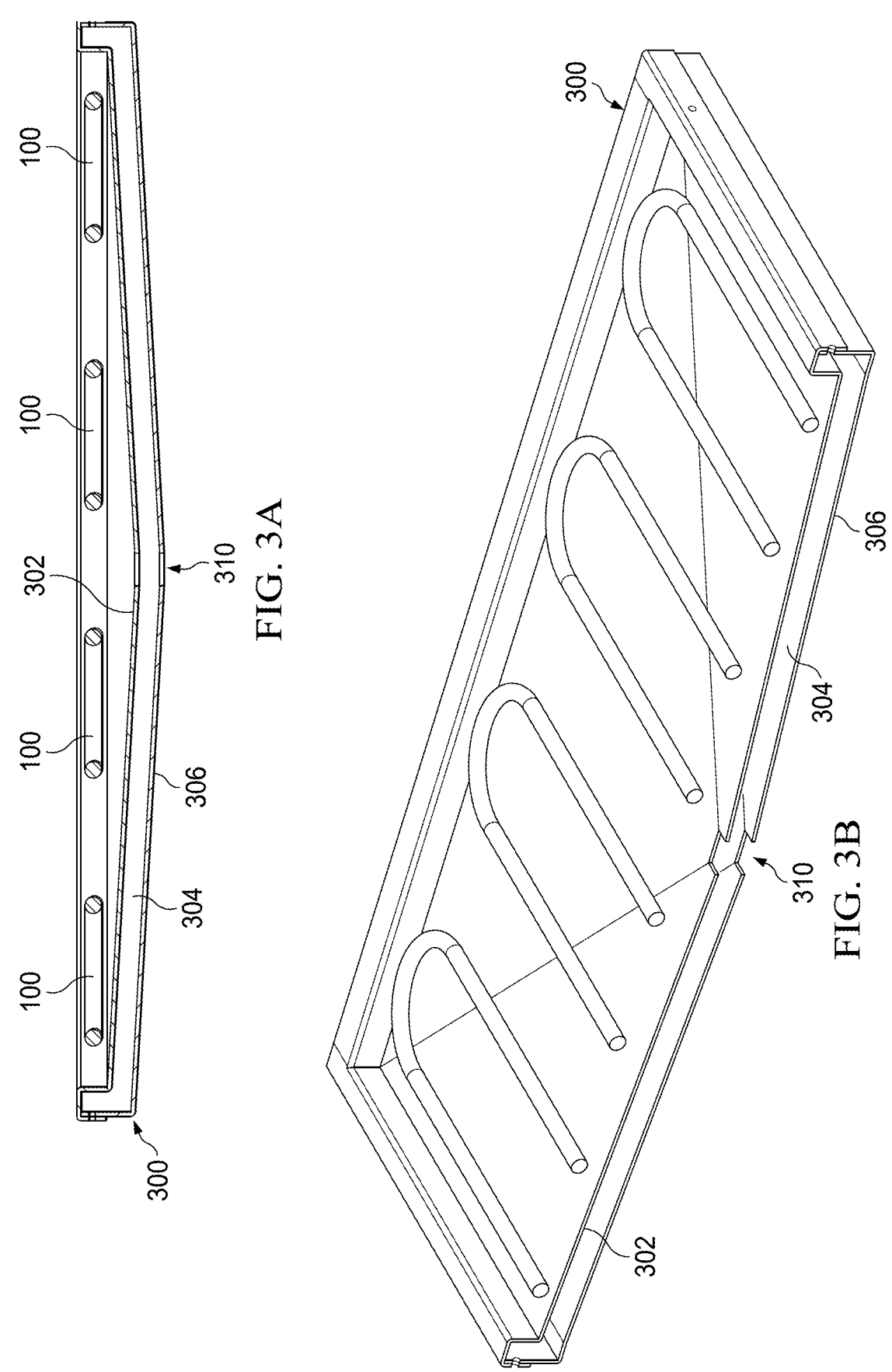
FIG. 3A is an end cutaway view of an electric firebox according to aspects of the present disclosure.
FIG. 3B is a perspective end cutaway view of the firebox of FIG. 3A.

Referring now to FIG. 3A, an end cutaway view of an electric firebox 300 according to aspects of the present disclosure is shown. FIG. 3B is a perspective end cutaway view of the firebox 300 of FIG. 3A. The firebox 300 comprises a reflective surface 302 similar to the reflective surfaces 200, 220. A lower housing 306 is spaced apart from the reflective surface 302. An insulative layer 304 may occupy all or part of the space between the reflective surface 302 and the lower housing 306. The insulating layer 304 of the firebox 300 may comprise air, fiberglass, foam-based insulation such as polystyrene, or other insulators. An air passage 310 may be defined through the reflective surface 302, insulative layer 304, and/or housing 306 to allow some convective air to flow into the firebox 300 from below. The air allowed to enter via the air passage 310 may be carefully controlled, as discussed below.

Figure 4A:
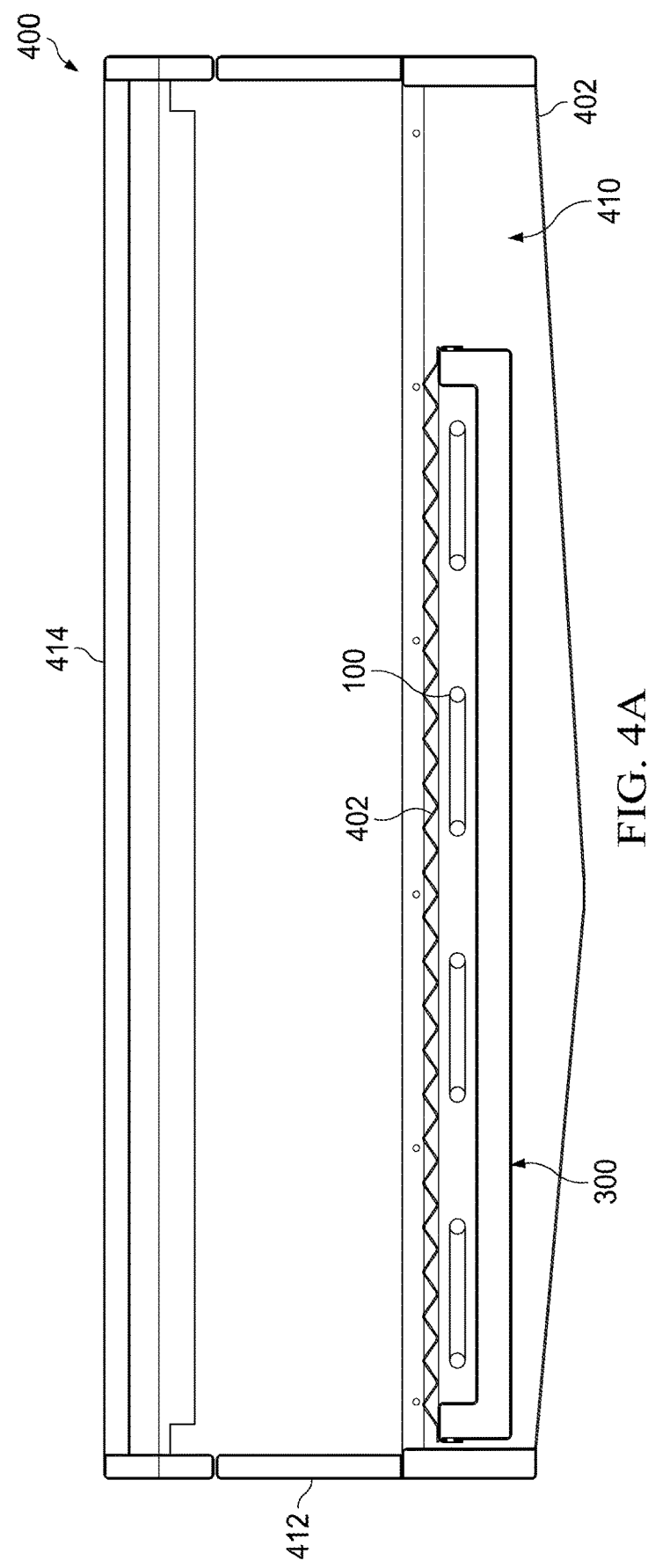
FIG. 4A is a side cutaway view of a cooking chamber according to aspects of the present disclosure.
Figure 4B:
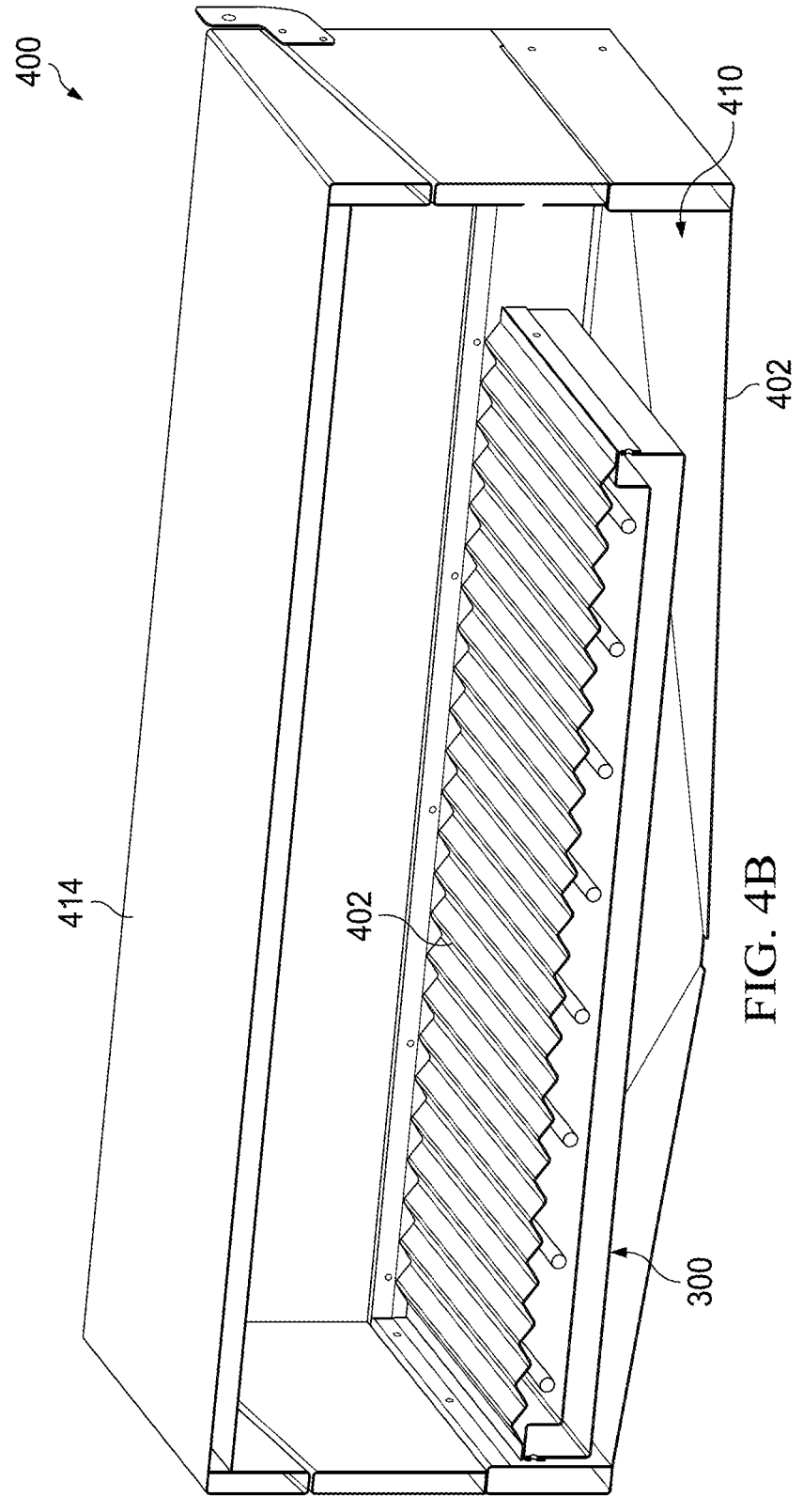
FIG. 4B is a side cutaway perspective view of the cooking chamber of FIG. 4A.

Referring now to FIG. 4A a side cutaway view of a cooking chamber 400 according to aspects of the present disclosure is shown. FIG. 4B is a side cutaway perspective view of the cooking chamber of FIG. 4A. Using a double-walled lid 414 and sidewall 412 around the cooking volume manages the thermal efficiency by minimizing heat loss from the entire cooking volume (including the electric firebox 300). The cooking chamber 400 may have space 410 near or adjacent to the firebox 300 for additional cooking or heating implements. For example, space 410 may provide room for a smoking apparatus or solid fuel burning device (e.g., as described below) for imparting additional flavor. Spaces between the double-walled portions 412, 414 may be filled with insulating materials (such as fiberglass or foamed based insulators) or can be air-tight features to benefit from motionless air in the cavity. Stationary air can behave as an insulation. For instance, the thermal conductivity of polystyrene foam insulations is about 0.033 to 0.057 W/mK, while the stationary air has a thermal conductivity of about 0.024 to 0.038 W/mK.

Stationary air behaves as a thermal insulator while free moving air acts as a convective heat transfer mechanism. Current electric grills with open cooking grates (similar to convective gas grills) suffer from the heat loss through free air movement driven by buoyancy. As the warm air moves upward and the heat escapes the cool air enters the cooking chamber and further reduces the heat available for cooking. A fully closed air-tight cooking surface on the other hand turns the air around the heating element to an insulating material. One aspect of the present disclosure is to provide a highly restrictive cooking system to balance between the convective transfer and conductive isolating properties of the air. FIGS. 5A-B and 6A-B illustrate various approaches of the present disclosure to implement such a balanced approach.

Figures 5A, 5B:
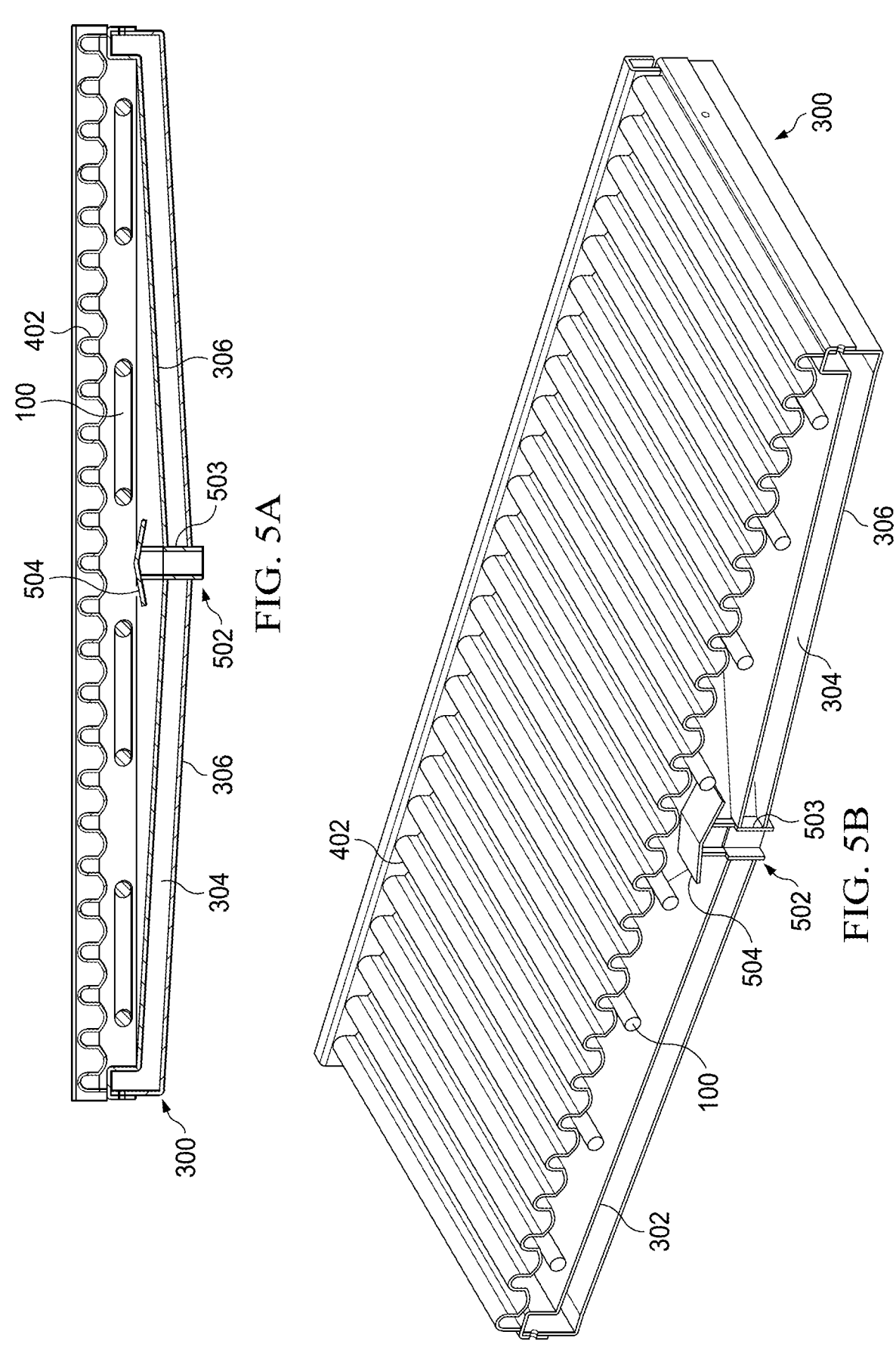
FIG. 5A is an end cutaway view of a firebox with cooking grate and air restrictor according to aspects of the present disclosure.
FIG. 5B is an end cutaway perspective view of the firebox, cooking grate, and air restrictor of FIG. 5A.

FIG. 5A is an end cutaway view of a firebox 300 with cooking grate 402 and air restrictor 502 according to aspects of the present disclosure; while FIG. 5B is an end cutaway view of the system and configuration of FIG. 5A. FIG. 6A is an overhead view of a combination cooking grate and restrictive emitter plate 402 according to aspects of the present disclosure that may be used with the arrangement as shown in FIGS. 5A-B. FIG. 6B is a close-up overhead view of the combination cooking grate and restrictive emitter plate of FIG. 6A.

As seen in FIG. 5, the heating element 100 is sandwiched between the reflective surface 302 of firebox 300 from the bottom and the cooking surface 402 from the top. An opening in the firebox allows for limited airflow towards the heating element. Here, a restrictor 502 defines a tubular passageway 503 through the firebox (e.g., as similar to the opening 310 discussed above). The restrictor provides a cover 504, possibly in the shape of a dome, to control and prevent both the upward jet stream of the air and the escape of the radiative heat through the opening or tube 503. In this way, some convective heating is allowed to occur via the cooking surface 402, described below, but air is not allowed to flow freely such that the firebox 300 and cooking surface 402 are cooled more quickly than they can be heated by heating element 100. In some embodiments, the passageway 503 may be replaced or supplemented with a plurality of passageways, possibly with a plurality of restrictor covers.

The cooking surface 402 is both the receiver (from the heating element 100) and the emitter (to the food) of radiative cooking heat. As a majority of the heat generated by the heating element 100 is directed to the cooking surface 402, its temperature rises and the heat transfer to the food is achieved. The food may be heated by a combination of direct contact, radiation, and/or convection.

The cooking surface 402 may be seen in FIGS. 6A-6B to comprise a series of ribs, peaks, or summits 602 interposed by a number of troughs or valleys 604. The summits 602 allow for direct heat conduction to the food while. Air slots or openings 606 may be defined in the valleys 604 and prevent air entrapment under the cooking surface 402. This prevent the air from becoming stationary and acting as a thermal barrier around the heating element 100. Dimensioning and distributing these small openings 606 are a consideration in balancing between the thermal cooling effect of free air movement and thermal insulating effect of still air. In some embodiments, to get a best effect, the ratio of the perforation to the cooking surface needs to be between 5 to 15%, while the optimized range for the slot width is between 0.8 and 2.2 mm and the optimum slot length to width ratio is between 6 and 12. It is understood that other arrangements such as round openings can achieve the same goal, when properly sized and distributed.

Heating element 100 positioning has also an impact on the thermal efficiency of the system. As seen in FIGS. 5A-B, a long axis of the heating element 100 may be vertically aligned with the troughs of the emitter plate to minimize the thickness of the air film between the heating element 100 and the cooking surface 402 thus reducing the insulative impact of the air providing a more uniform view factor between each segment of the emitter plate and the heating element surface (increasing the radiative transfer).

Although the illustrated heating element 100 has a uniform distribution resulting in equal distancing between neighboring axes, non-uniform distancing can be part of the thermal optimization to have higher intensity of heat generation in the areas that have higher rate of heat loss. Moreover, alternative heating element designs can be utilized to enhance the efficiency of the electric grill. Some alternative designs are illustrated in FIGS. 7A-7D.

Figure 7A:
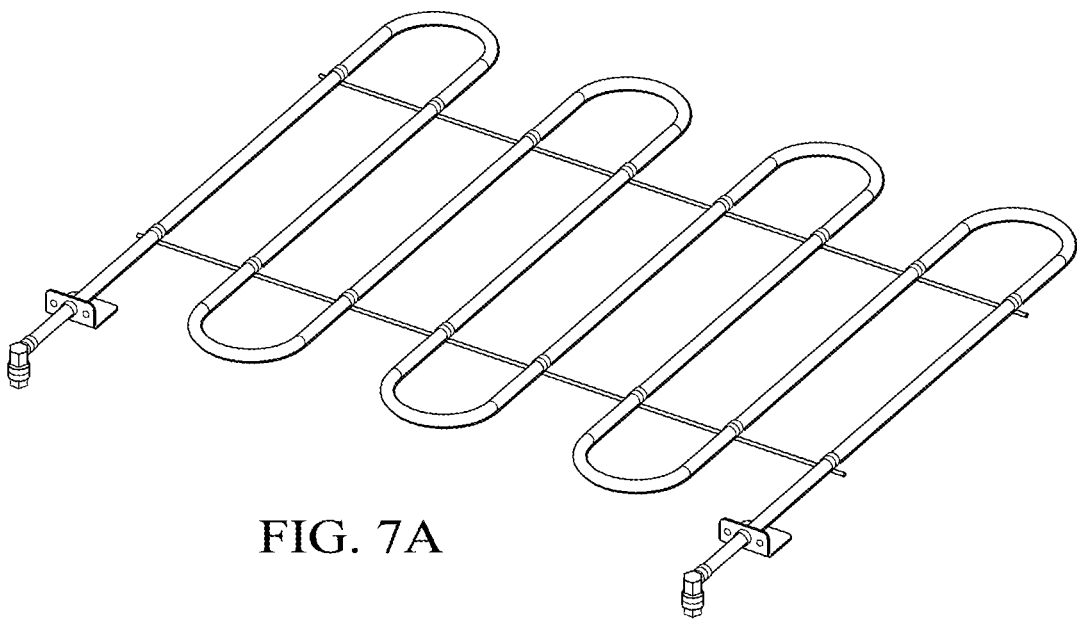
FIG. 7A is a perspective view of a resistive heating element according to aspects of the present disclosure.
Figure 7B:
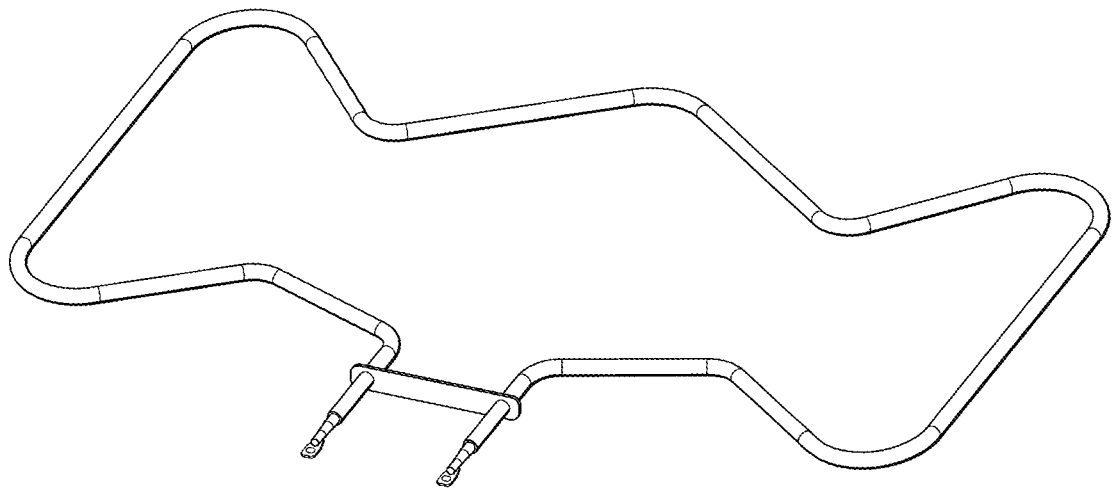
FIG. 7B is a perspective view of another resistive heating element according to aspects of the present disclosure.
Figure 7C:
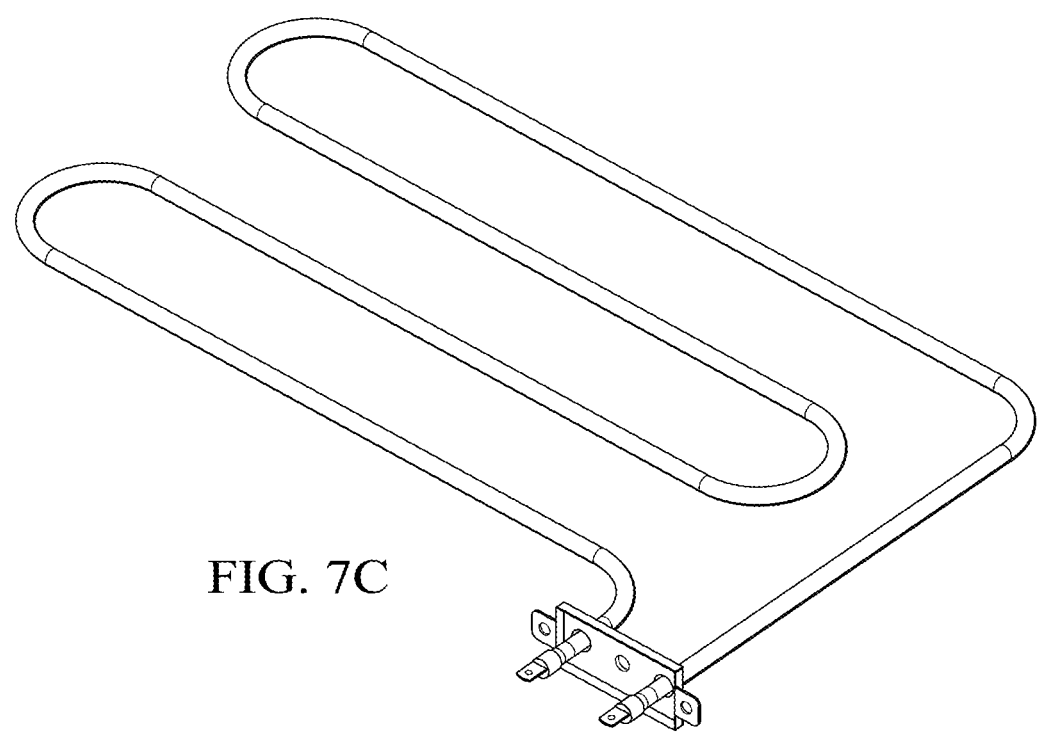
FIG. 7C is a perspective view of a third resistive heating element according to aspects of the present disclosure
Figure 7D:
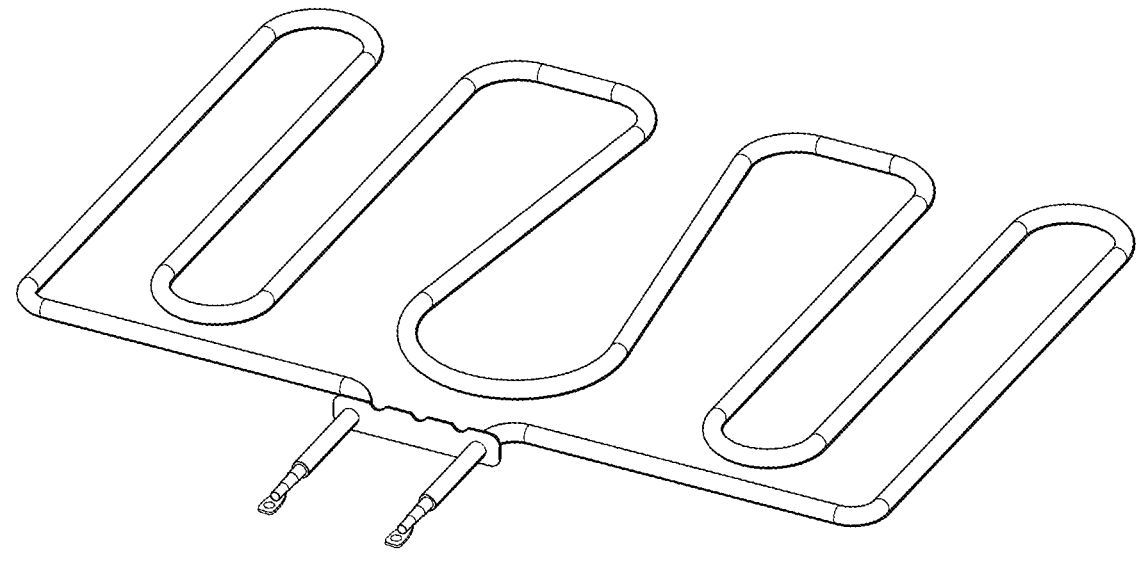
FIG. 7D is a perspective view of a fourth resistive heating element according to aspects of the present disclosure

FIG. 7A illustrates a heating element with a front to back looping arrangement and electrodes on left and right sides. FIG. 7B illustrates a heating element with front centered electrodes and "zigzag" from a perimeter of a cooking area. FIG. 7C illustrates a right-left looping arrangement with electrodes on a right side. FIG. 7D illustrates another front to back loop arrangement with front centered electrodes. It should be understood that these configurations are exemplary and illustrative of the many configurations that may be achieved by a Calrod® heating element or similar.

Figure 8A:
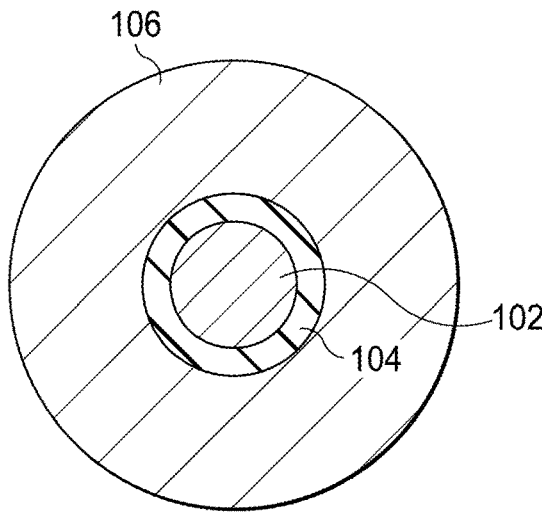
FIG. 8A is an end cutaway view of a resistive heating element according to aspects of the present disclosure.
Figure 8B:
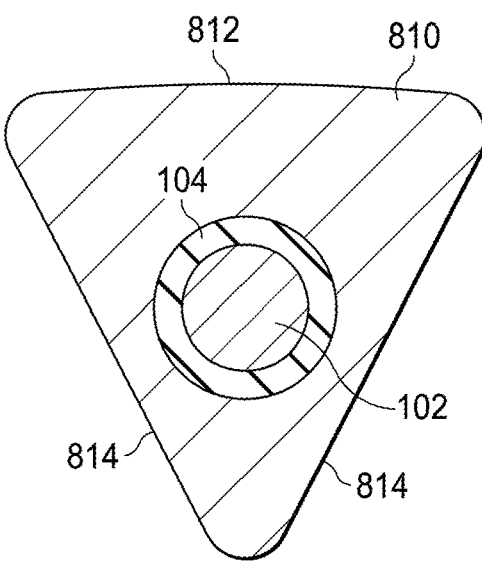
FIG. 8B is an end cutaway view of another resistive heating element according to aspects of the present disclosure.
Figure 8C:
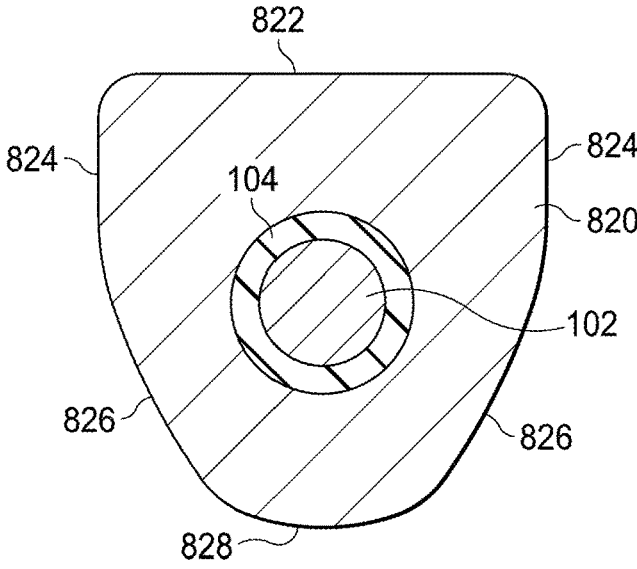
FIG. 8C is an end cutaway view of a third resistive heating element according to aspects of the present disclosure.

Additionally, although the heating element rods may have a round cross-section, it is possible to use different profiles. A round cross-section results in a more radially uniform rate of radiative transfer (e.g., FIG. 8A). However, the cross-section profile can be optimized to allow for a higher rate of heat transfer towards a desired target surface. This is achieved by increasing view factor between the heating element surface and the target surface. FIG. 8B illustrates an embodiment where the outer metallic layer 810 has a triangular cross section with an upper surface 812 and descending side surfaces 814. Another version of an outer metallic layer 820 can be seen in FIG. 8C with an upper flat surface 822. Here two short descending side surfaces 824 can be seen leading to inward curving surfaces 826 and finally a lower round surface 828. The cross-sectional configuration of the metallic casing, and thus the heating element, can therefore be altered to improve the reflectance characteristics from the heat shield below, and the heat transfer characteristics to the cooking surface above.

It will be appreciated that systems and methods of the present disclosure provide a number of modes of operation. In one example, fats, juices, and other substances that flow from meat when it is cooked may run into the cooking grate/emitter plate 402. The limited air flow through the emitter plate 402 serves to keep the temperature of the plate 402 high enough that some of these substances will vaporize providing additional flavor to the meat or other items on the plate 402.

Liquids that flow or seep through the openings 606 may encounter even higher temperatures below the emitter plate 402, inside the electric firebox 300, near the heating elements 100 and/or the reflector 302, for example. These liquids may vaporize here and flow back through the openings 606 to enhance flavor. Being very near the heating elements 100, the vaporized liquids may have a chance to ignite. However, the limited airflow within the firebox 300 (and/or the configuration of the openings 606) may serve to minimize flareups, even while the higher temperatures maintained in the firebox 300 further promote vaporization and enhanced flavor.

Figure 9:
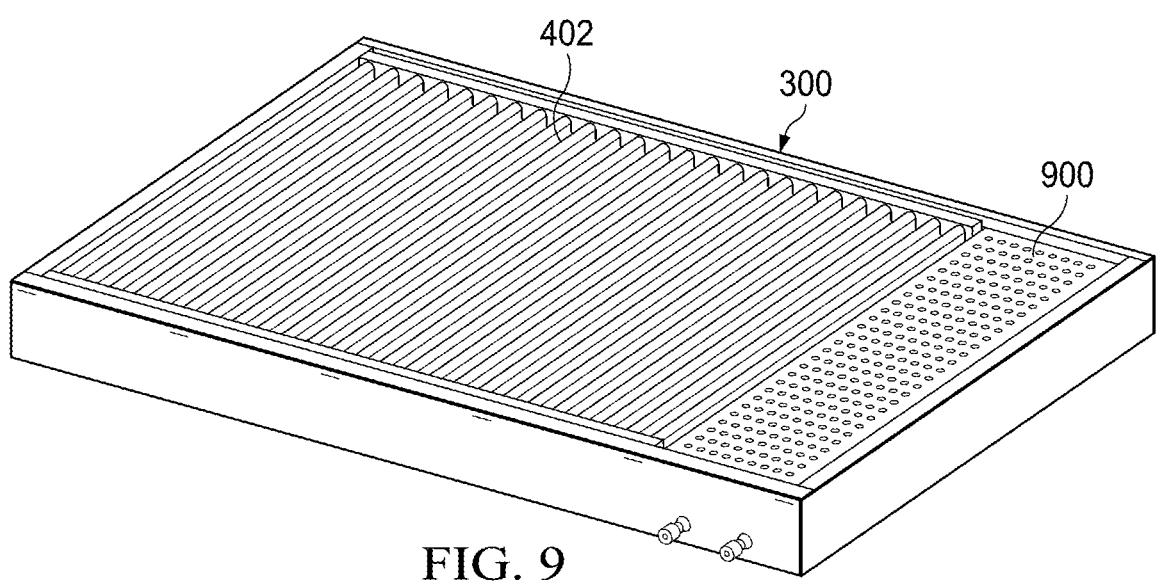
FIG. 9 is a perspective view of an electric firebox with electric smoker box according to aspects of the present disclosure.

Referring now to FIG. 9, a perspective view of an electric firebox 300 with electric smoker box 900 according to aspects of the present disclosure is shown. The electric smoker box 900 may be provided to complement the cooking functionality of the firebox 300 and the emitter plate/grate 400. Wood chips or other smoking and flavor-enhancing products may be burned or combusted under electric power within the smoker box 900. The smoker box 900 may also be utilized without heating the grate 402 in order to cook with smoke alone. The smoker box 900 may be fitted into a completed grill such as those discussed above (e.g., within cooking chamber 400, FIG. 4). The smoker box 900 may be fitted into the space 410 or elsewhere. In other embodiments, the smoker box 900 is a standalone item that may be installed into cooking devices other than those shown herein, including those without separate electric or gas grilling capabilities.

Figure 10:
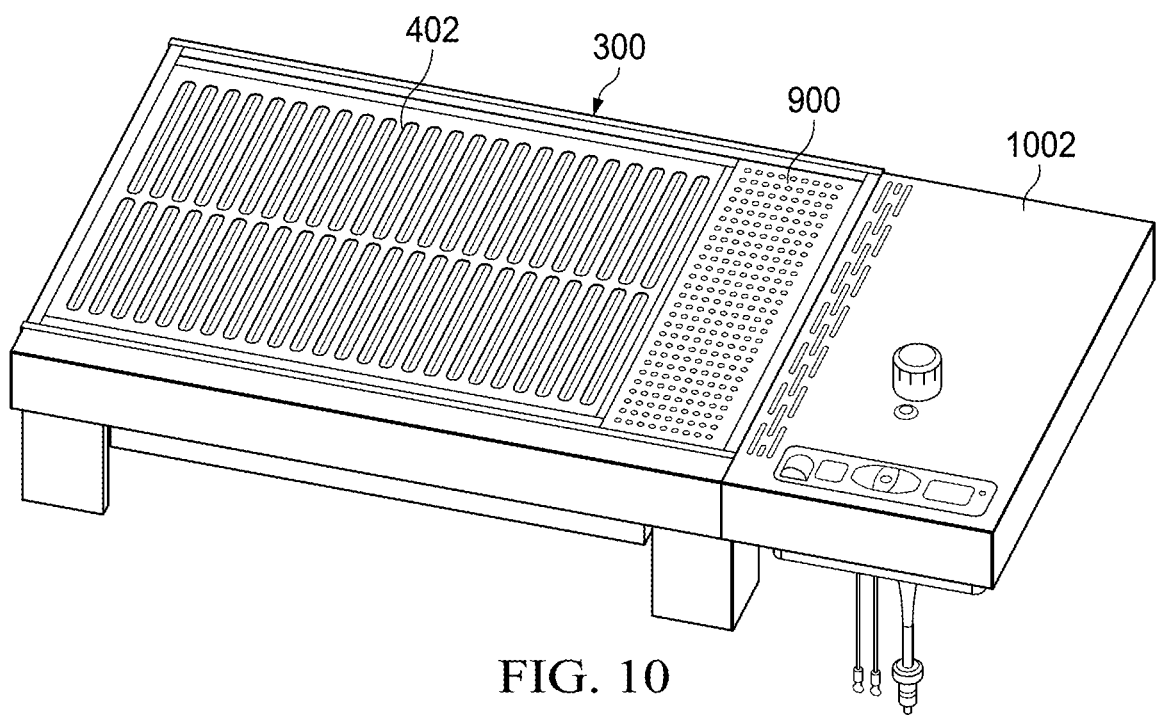
FIG. 10 is a perspective view of an electric firebox with electric smoker box and control panel according to aspects of the present disclosure.

Referring now to FIG. 10, a perspective view of the electric firebox 300 with electric smoker box 900 and a control panel 1002 according to aspects of the present disclosure is shown. The control panel 1002 is formed on a portion of a side shelf (e.g., outside the cooking chamber 400). Various knobs, buttons, and switches as are known in the art enable for selection and operation of the heating elements 100 inside the firebox as well as those discussed further below that operate within the smoker box 900. In other embodiments, the control panel 1002 may be provided in another convenient location.

Figures 11, 12:
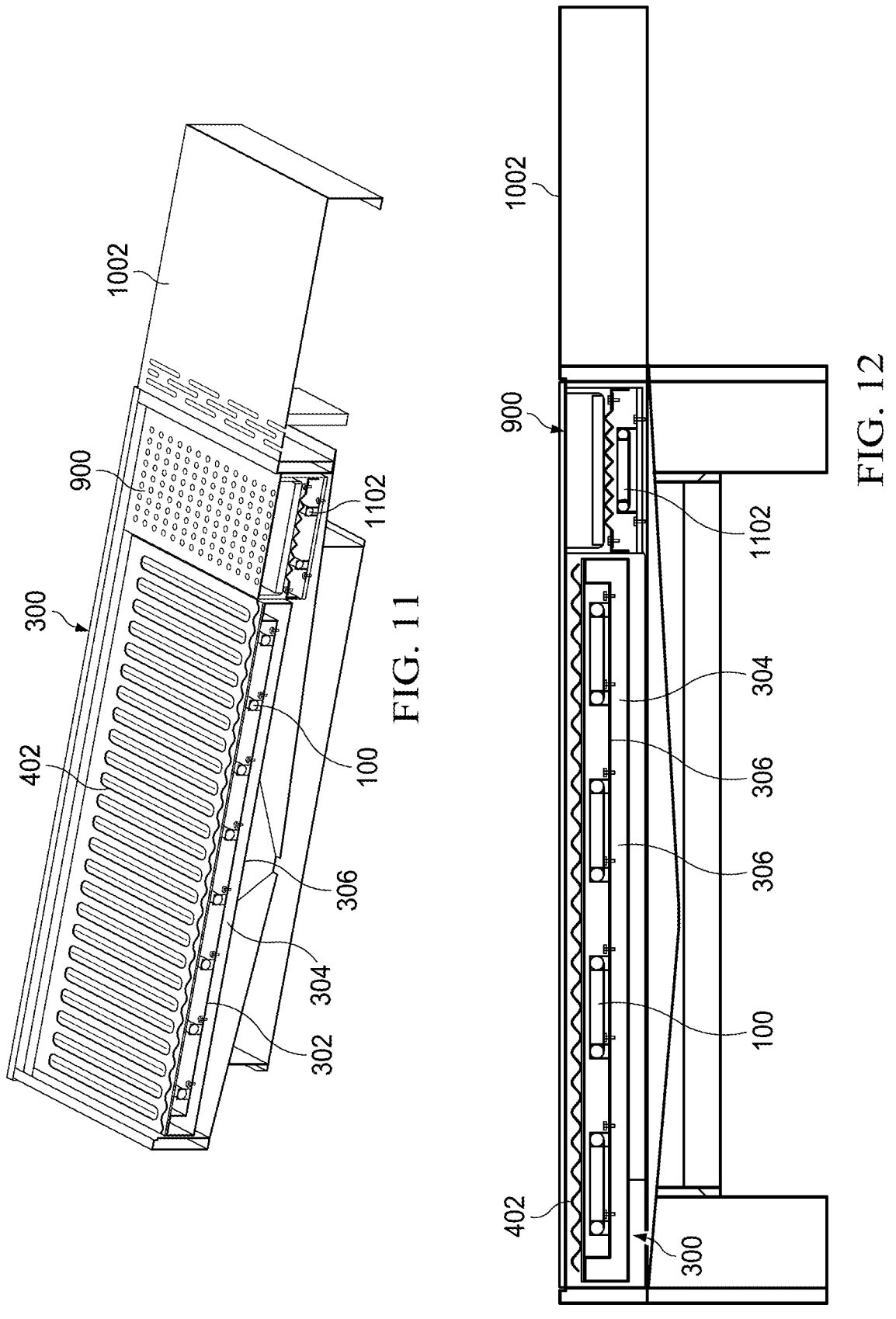
FIG. 11 is a perspective cutaway view of the electric firebox of FIG. 10.
FIG. 12 is a frontal transverse cutaway view of the electric firebox of FIG. 10.

Referring now to FIG. 11, a perspective cutaway view of the electric firebox 300 of FIG. 10 is shown. The double walled construction of the firebox 300 can be seen again from this perspective. The adjacent smoker box 900 can also be seen to contain one or more heating elements 1102 that may be the same or a different type from the heating element(s) 100 of the firebox 300. A back portion of the side shelf/control panel 1002 can also be seen. FIG. 12 is a frontal transverse cutaway view of the electric firebox of FIG. 10.

Figure 13:
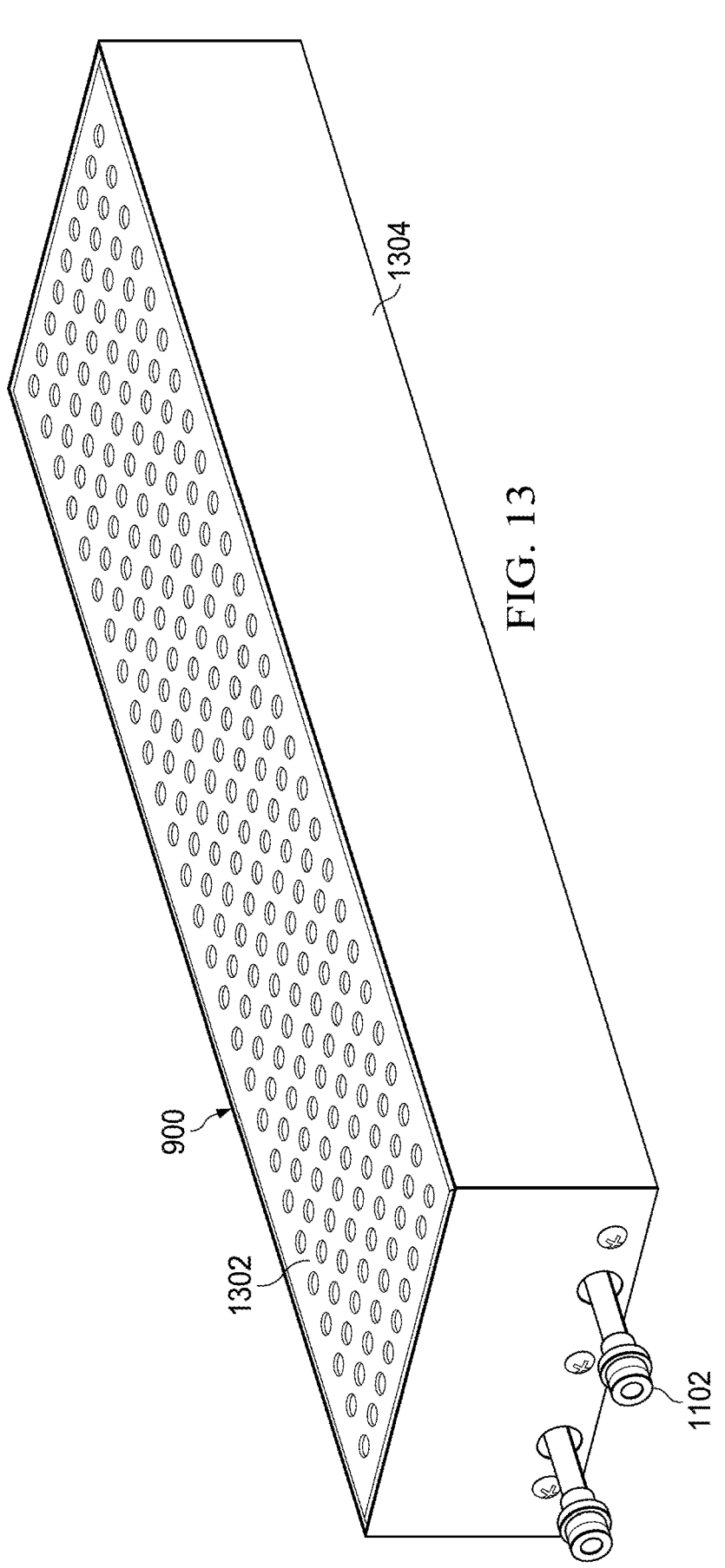
FIG. 13 is a perspective view of an electric smoker box according to aspects of the present disclosure.

Referring now to FIG. 13, a perspective view of the electric smoker box 900 according to aspects of the present disclosure is shown. FIG. 13 illustrates the smoker box 900 removed from its location or space 401 adjacent to the fire box 300. The smoker box 900 comprises a box or container 1304 that may be sized to fit into space 401 or another space. It may be sized with respect to the amount of wood chips or other material that provides smoke, flavorings, and/or outgassing when heating (generally referred to herein as "media" or "smoking media"). The container 1304 may be rectilinear, as shown, to complement a square firebox, cooking grate, or cooking chamber, but may have other overall shapes as well. The heating element 1102 can be seen to pass through and into the container 1304 for heating the smoking media.

The container 1304 may have a cover or top plate 1302 through which the smoke produced in the container 1304 may escape into the cooking chamber. The top plate 1302 may comprise a planar element or have another shape with perforations defined therein. In some embodiments, the perforations are round and evenly spaced. In other embodiments, only a portion of the top plate 1302 is perforated. The size of the perforations may vary but allow smoke to escape while keeping the smoking media covered or isolated from the rest of the cooking chamber.

Figure 14:
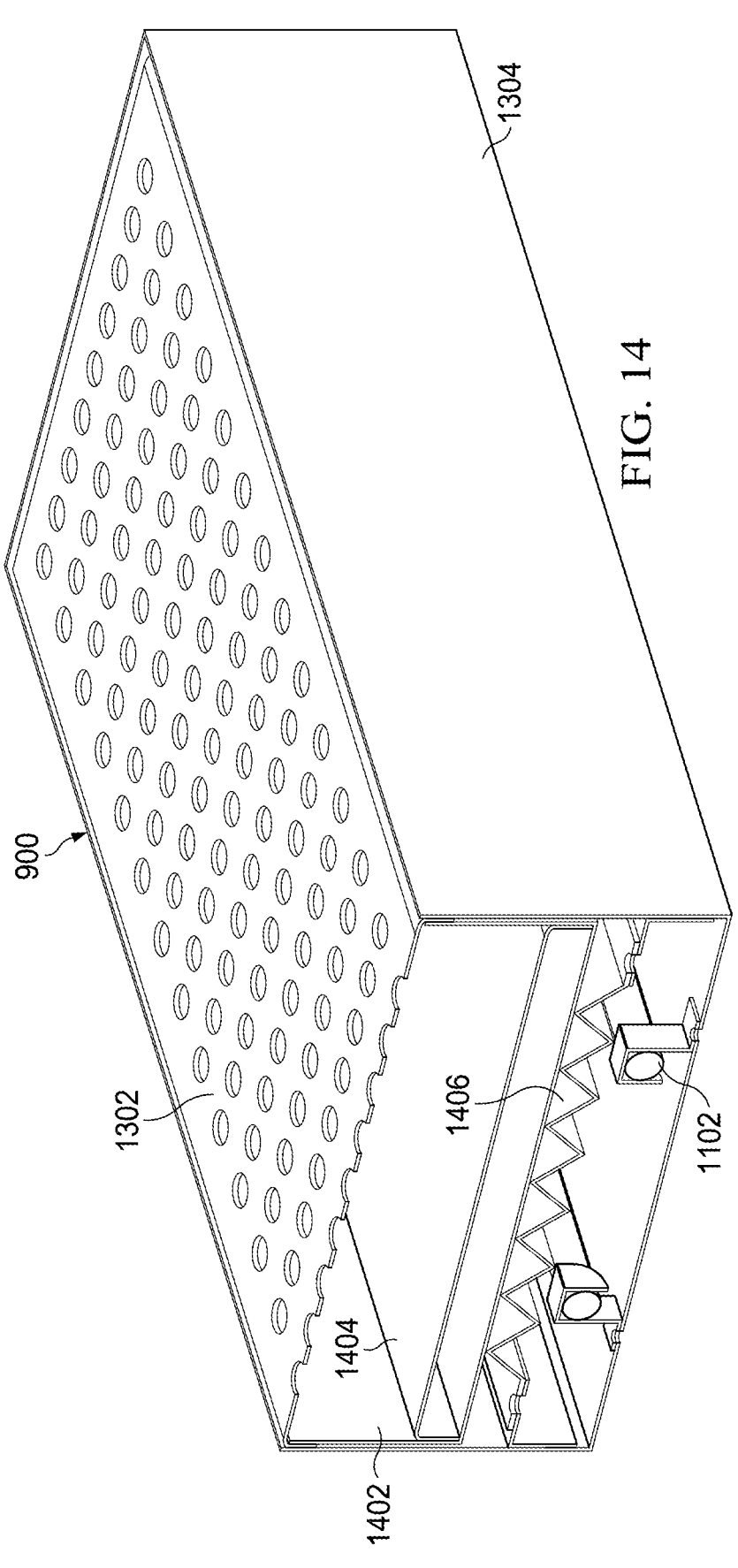
FIG. 14 is a perspective cutaway view of an electric smoker box according to aspects of the present disclosure.
Figure 16:
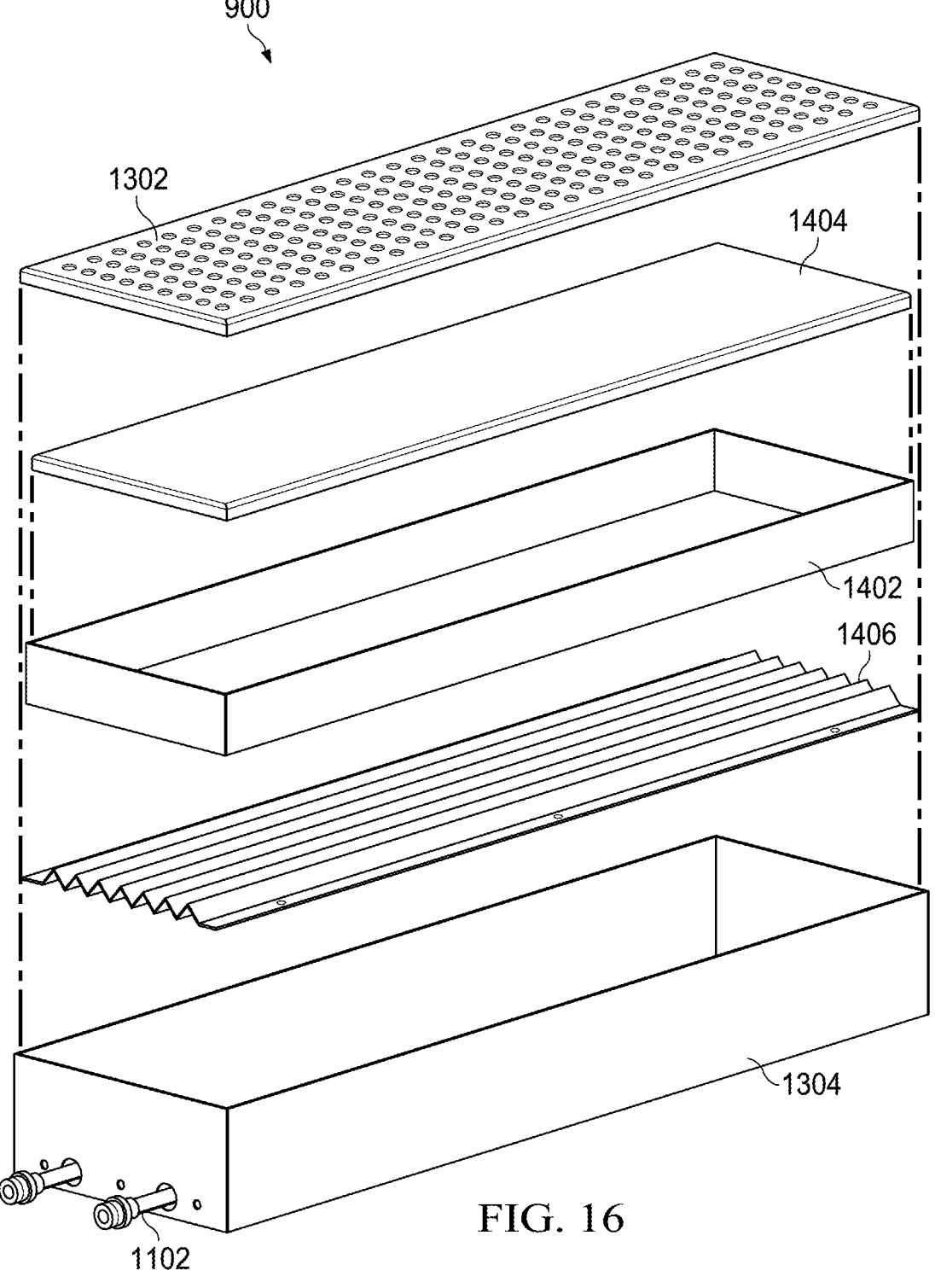
FIG. 16 is an exploded view of the electric smoker box of FIG. 14.
Figure 17:
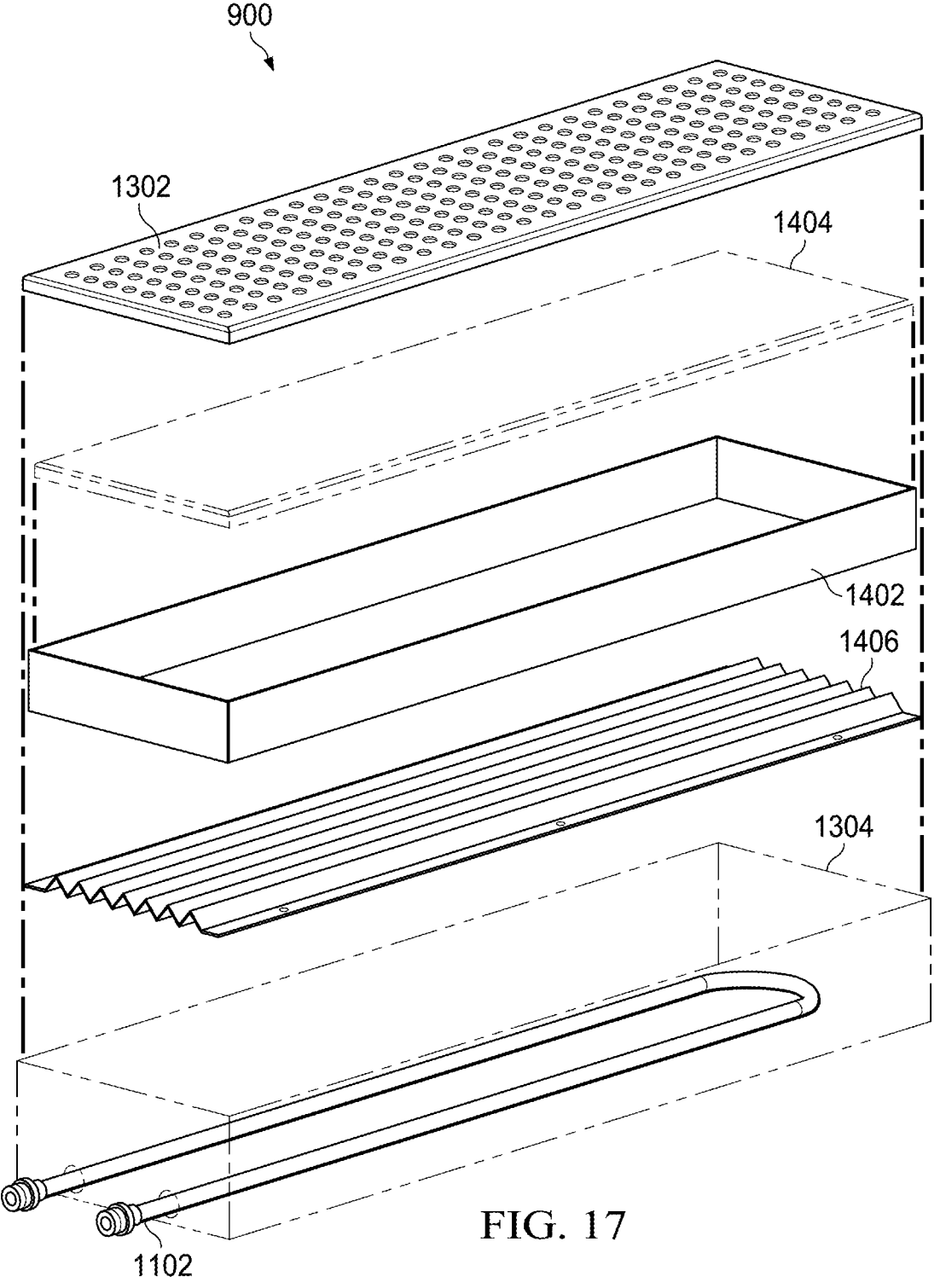
FIG. 17 is another exploded view of the electric smoker box of FIG. 14.

Referring now to FIG. 14, a perspective cutaway view of the electric smoker box 900 according to aspects of the present disclosure. FIGS. 16-17 provide exploded views of the electric smoker box of FIG. 14. FIGS. 14, 16, and 17 collectively illustrate one possible internal configuration for the smoker box 900. As described, the smoker box 900 may comprise a container 1304 with a top plate 1302. Inside the container 1304 and below the top plate 1302 is a media tray 1402, which may contain a standoff or spacer 1404. The sides and bottom of the container 1304, the top plate 1302, the media tray 1402, and the standoff 1404 are all illustrated as generally planar elements. However, these may be corrugated and/or have ridges/valleys or other non-planar features or textures.

Smoking media or other consumables may be placed into the tray 1402 on top of the standoff 1404. It is also possible to utilize the tray 1402 and/or the top plate 1302 as a warming zone. In such usage, the user may prefer not to have any media in the tray 1402. The tray 1402 may sit on or above an emitter plate 1406 interposing the tray 1402 and the heating element 1102.

The emitter plate 1406 may be corrugated to promote even heating. The plate 1406 may absorb heat from the heating element 1102 that is re-emitted more evenly to the bottom of the tray 1402 than may occur if the tray 1402 were exposed directly to the heating element 1102. In embodiments including the standoff 1404, spacing between the standoff 1404 and bottom of the tray 1402 may be used to further control temperature of the media or the warming function. The heating element 1102, the emitter plate 1406 and the tray 1402 may be located within the container 1304, and in proper relationship to one another, by brackets or other mechanical fixtures.

Figure 15:
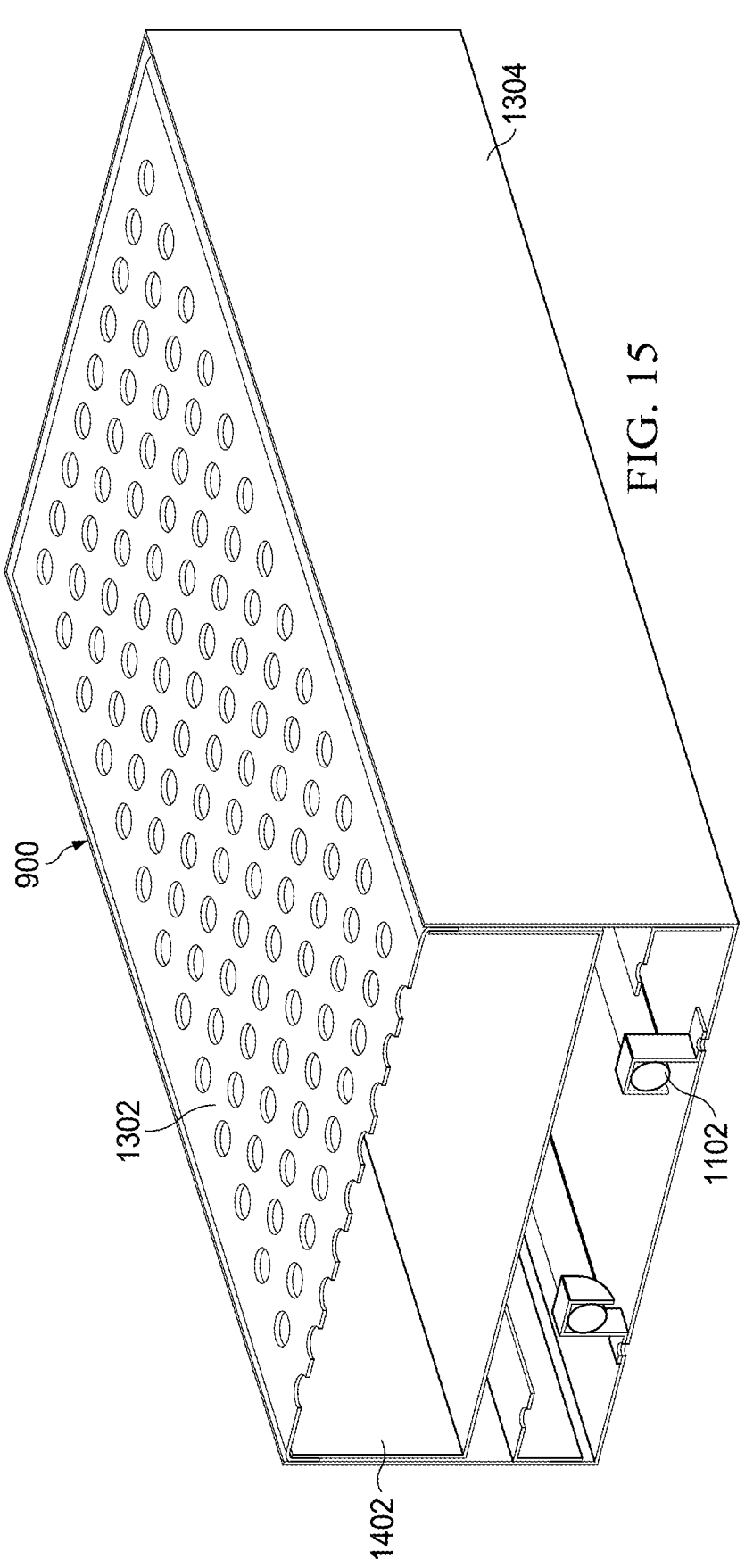
FIG. 15 is another perspective cutaway view of an electric smoker box according to aspects of the present disclosure with different internal construction.
Figure 18:
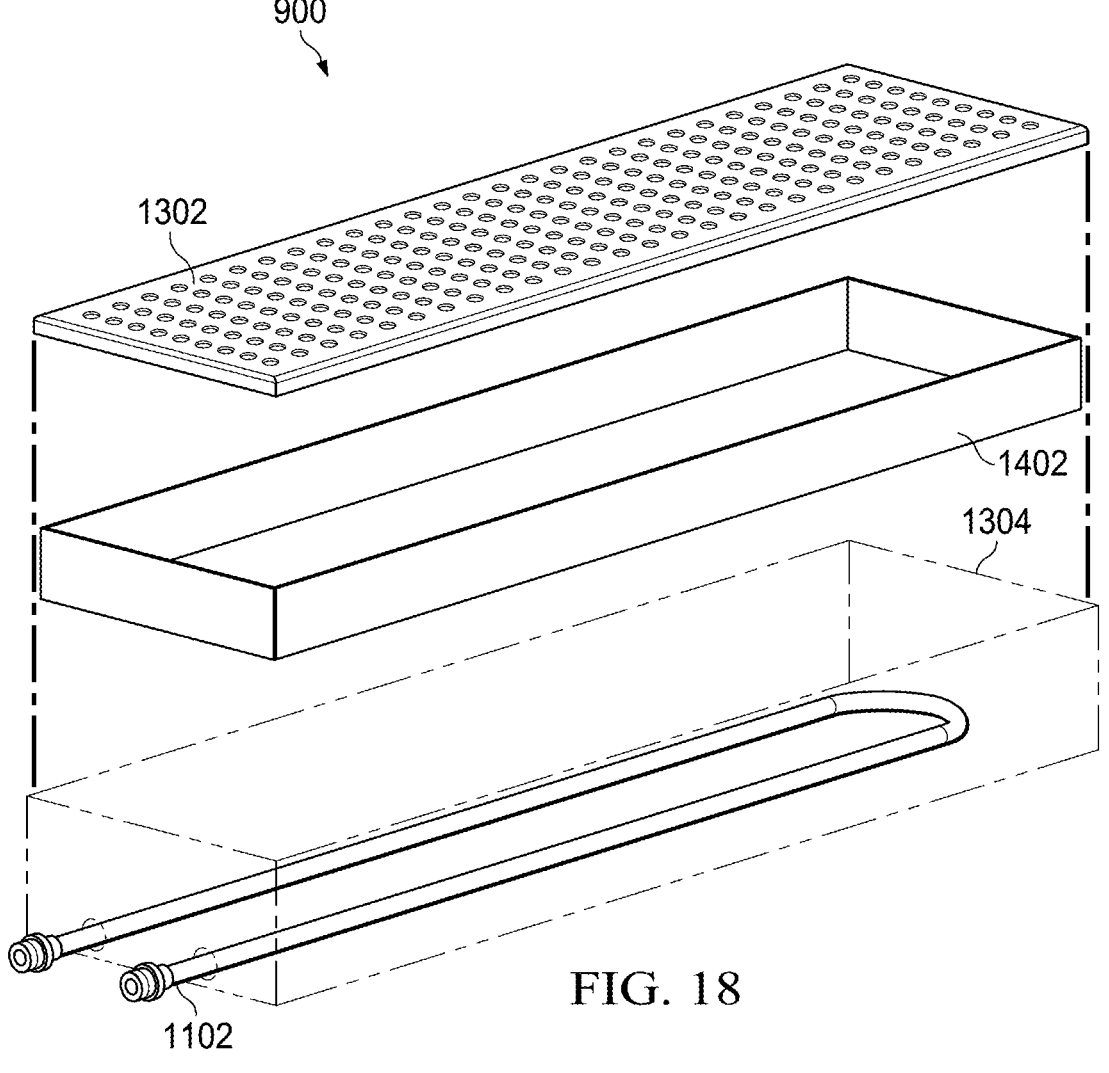
FIG. 18 is an exploded view of the electric smoker box of FIG. 15.
Figure 19:
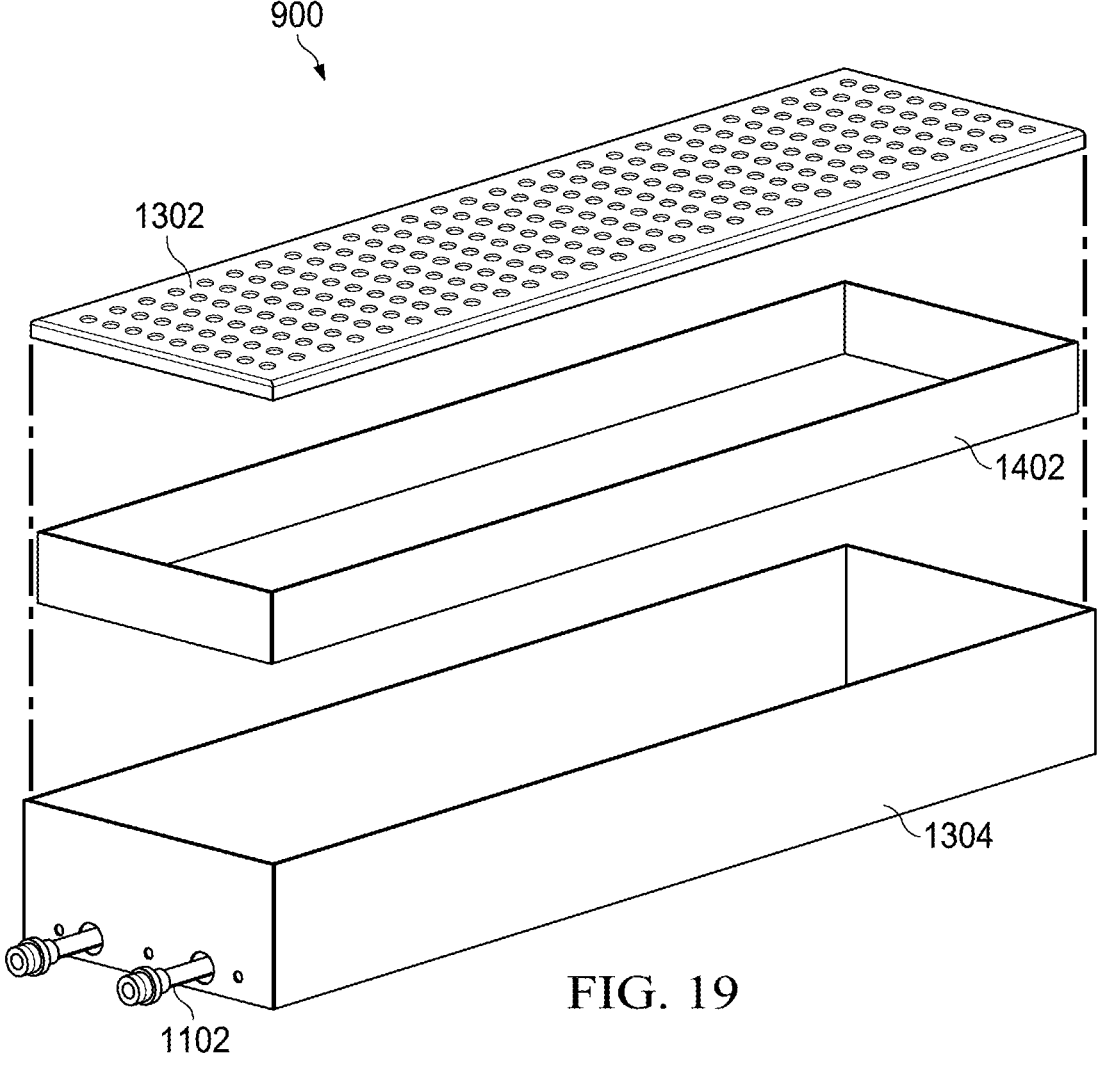
FIG. 19 is another exploded view of the electric smoker box of FIG. 15.

Referring now to FIG. 15 another perspective cutaway view of the electric smoker box 900 according to aspects of the present disclosure with different internal construction. FIGS. 18 and 19 are additional exploded views of the electric smoker box of FIG. 15. FIGS. 15, 18, and 19 may be considered additional embodiments of the smoker box 900. In these views, the standoff 1404 is not present, nor is the emitter plate 1406. Thus, heat energy from heating element 1102 is not absorbed and re-emitted. The emitter plate 1406 is also not provided for additional temperature control means. In such embodiments, temperature may be applied evenly enough to the tray 1402 for the chosen media without the emitter plate. Similarly, the standoff 1404 would not be needed for further control or refinement of temperature.

In one embodiment, when the smoker box heating element 1102 is not energized the main heating element (e.g., 100) is supplied with the maximum available household circuit power to the grill. When the smoker box 900 is energized, the maximum available household circuit power is shared by the smoker box element 1102 and the main electric grill heating element 100 at predetermined levels. For example, if 1800 W is supplied to the main electric grill heating element 100 when the smoker box 900 is not energized, when the smoker box 900 is energized 1600 W is supplied to the main electric grill heating element and 200 W is supplied to the smoker box heating element. Of course, this is just an illustrative example and different values may be chosen in practice.

The smoke produced by an appropriate sizing of the power level of the smoker heating element 1102 and an appropriate design of the airflow in and out of the smoker box (e.g., vie perforations in top plate 1302) will exit to spread laterally above and across the face of the main cooking surface (e.g., grate 402) thereby exposing the food being cooked to wood smoke, from which flavor producing elements will be transferred to the food.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A cooking apparatus comprising: a first electric heating element;

a reflective surface below the first electric heating element; a cooking surface above the first electric heating element;

an insulative layer below the reflective surface that impedes escape of heat below the reflective surface; and a lower housing below the insulative layer;

an air passage tube traversing through the lower housing, the insulative layer, and the reflective layer but terminating below the cooking surface to allow air flow from below the lower housing to the first electric heating element;

a restrictor cover attached to a top of the air passage tube between the reflective layer and the cooking surface that limits air flow through the air passage tube above the reflective surface toward the cooking surface;

wherein the cooking surface is heated by radiant energy from the electric heating element and becomes heated to emit heat to food on the cooking surface.

2. The cooking apparatus of claim 1, wherein the cooking surface defines a plurality of air slots allowing heated air to rise from below the cooking surface to above the cooking surface.

3. The cooking apparatus of claim 1, further comprising a restrictor cover above a top of the air passage tube that limits air flow through the air passage tube.

4. The cooking apparatus of claim 3, wherein the cooking surface defines a plurality of spaced apart peaks interposed by a plurality of valleys, the plurality of air slots being defined in the plurality of valleys.

5. The cooking apparatus of claim 4, wherein the first electric heating element is arranged to be under one of the plurality of valleys.

6. The cooking apparatus of claim 1, further comprising a smoker box adjacent to the cooking surface, the smoker box and the cooking surface sharing a common cooking volume within a cooking chamber.

7. The cooking apparatus of claim 6, wherein the smoker box further comprises a second electric heating element below a smoking media tray.

8. The cooking apparatus of claim 7, wherein the first electric heating element and the second electric heating element share total power available from a household outlet.

9. The cooking apparatus of claim 8, further comprising an emitter plate interposing the second heating element and the media tray.

10. The cooking apparatus of claim 9, wherein the emitter plate is corrugated.

11. The cooking apparatus of claim 10, further comprising a standoff in the smoking media tray.

12. A cooking apparatus comprising at least one electric heating element;

a cooking surface above the heating element, the cooking surface absorbing energy from the heating element and reemitting the absorbed energy to heat food;

a reflective surface below the electric heating element having a contour configured to reflect heat radiating downward from the at least one electric heating element back toward the cooking surface;

a lower housing spaced apart from the reflective surface to define an insulating space between the reflective surface and the lower housing;

an air passage tube traversing through the lower housing, the insulative layer, and the reflective layer but terminating below the cooking surface to allow air flow from below the lower housing to the first electric heating element;

a restrictor cover attached to a top of the air passage tube between the reflective layer and the cooking surface that limits air flow through the air passage tube above the reflective surface toward the cooking surface;

wherein the reflective surface and the lower housing define first and second spaced apart and aligned openings, respectively;

wherein the reflective surface and the lower housing define no other air passages into the insulating layer apart from the first and second aligned openings; and wherein the air passage tube passes through the first and second aligned openings.

13. The cooking apparatus of claim 12, wherein the cooking surface defines a plurality of spaced apart peaks with a plurality of air slots between adjacent ones of the plurality of spaced apart peaks.

14. The cooking apparatus of claim 12, further comprising at least one additional electric heating element in a smoking box adjacent to the cooking surface, the smoking box and cooking surface being contained in a single cooking chamber.

15. A cooking apparatus comprising:

a cooking chamber defined by a double walled lid and sidewall, the cooking chamber situated over a cooking surface and an adjacent smoker box;

a first electric heating element below the cooking surface that heats the cooking surface;

a reflective surface below the first electric heating element that reflects radiant heat from the first electric heating element upward toward the cooking surface;

a heat insulator below the reflective surface;

an air passage tube traversing through the reflective surface and the heat insulator but terminating below the cooking surface to allow air flow from below the heat insulator to a space between the reflective surface and the cooking surface;

a restrictor proximate a top of the air passage tube situated to move air from the air passage tube away from sides of the air passage tube and to limit the air flow from below the heat insulator to the space between the reflective surface and the cooking surface; and a second electric heating element that heats the smoker box to produce smoke from smoking media in the smoker box, the smoke escaping the smoker box from a top thereof into the cooking chamber.

16. The cooking system of claim 15, further comprising an air intake defined through the reflective surface to admit air below the cooking surface, and wherein the cooking surface defines a plurality of air openings whose area comprises from 5-15% of an area of the cooking surface.

17. The cooking system of any of claim 16, wherein each of the plurality of air openings defines a slot with a length between 0.8 and 2.2 mm and having a length to width ratio between 6 and 12.

* * * * *